United States Patent
Anderson

(10) Patent No.: US 7,107,937 B1
(45) Date of Patent: Sep. 19, 2006

(54) PET WASHING ASSEMBLY

(76) Inventor: Derrick C. Anderson, 7115 Riverhill Dr., Riverdale, GA (US) 30274

( * ) Notice: Subject to any disclaimer, the term of this patent is extended or adjusted under 35 U.S.C. 154(b) by 0 days.

(21) Appl. No.: 10/929,143

(22) Filed: Aug. 30, 2004

(51) Int. Cl.
*A01K 29/00* (2006.01)

(52) U.S. Cl. .................................... 119/671; 119/665
(58) Field of Classification Search ............ 119/603, 119/604, 665, 669, 671
See application file for complete search history.

(56) References Cited

U.S. PATENT DOCUMENTS

| | | | | |
|---|---|---|---|---|
| 3,734,057 A | * | 5/1973 | Lee et al. ................. | 119/665 |
| 3,884,191 A | * | 5/1975 | Stout ....................... | 119/671 |
| 4,020,796 A | | 5/1977 | Grifa | |
| 4,549,502 A | | 10/1985 | Namdari | |
| 4,782,792 A | * | 11/1988 | Anthony et al. .......... | 119/665 |
| 4,930,453 A | | 6/1990 | Laliberte | |
| D311,794 S | | 10/1990 | Barone | |
| 5,213,064 A | * | 5/1993 | Mondine et al. ......... | 119/671 |
| 5,243,931 A | | 9/1993 | McDonough | |
| 5,448,966 A | | 9/1995 | McKinnon et al. | |
| 5,632,231 A | * | 5/1997 | Moore ...................... | 119/671 |
| 5,678,511 A | * | 10/1997 | Day ......................... | 119/671 |
| 6,688,257 B1 | * | 2/2004 | Lee ........................... | 119/671 |

* cited by examiner

*Primary Examiner*—Robert P. Swiatek
*Assistant Examiner*—Elizabeth Shaw

(57) ABSTRACT

A pet washing assembly for includes a housing having a bottom wall, a top wall, a first lateral wall, a second lateral wall, a back wall and a front wall. The front wall has a door therein for selectively positioning a dog into an interior of the housing. The door has an aperture extending therethrough that adapted for receiving a head of the dog. A water inlet tube extends through the back wall. A plurality of supply tubes is positioned within the housing and each is fluidly coupled to the inlet tube. A plurality of nozzles is mounted with the housing. Each of the nozzles is fluidly coupled to one of the supply tubes.

13 Claims, 4 Drawing Sheets

PET WASHING ASSEMBLY

BACKGROUND OF THE INVENTION

1. Field of the Invention

The present invention relates to pet washing devices and more particularly pertains to a new pet washing device for containing a pet so that it may be sprayed with water and cleaned.

2. Description of the Prior Art

The use of pet washing devices is known in the prior art. While these devices fulfill their respective, particular objectives and requirements, the need remains for a device that includes elongated nozzles for ensuring that the pet is substantially covered with water as well as openings which may be used to reach into the device so that shampoo and the like may be easily applied to the pet.

SUMMARY OF THE INVENTION

The present invention meets the needs presented above by generally comprising a housing having a bottom wall, a top wall, a first lateral wall, a second lateral wall, a back wall and a front wall. The front wall has a door therein for selectively positioning a dog into an interior of the housing. The door has an aperture extending therethrough that adapted for receiving a head of the dog. A water inlet tube extends through the back wall. A plurality of supply tubes is positioned within the housing and each is fluidly coupled to the inlet tube. A plurality of nozzles is mounted with the housing. Each of the nozzles is fluidly coupled to one of the supply tubes.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
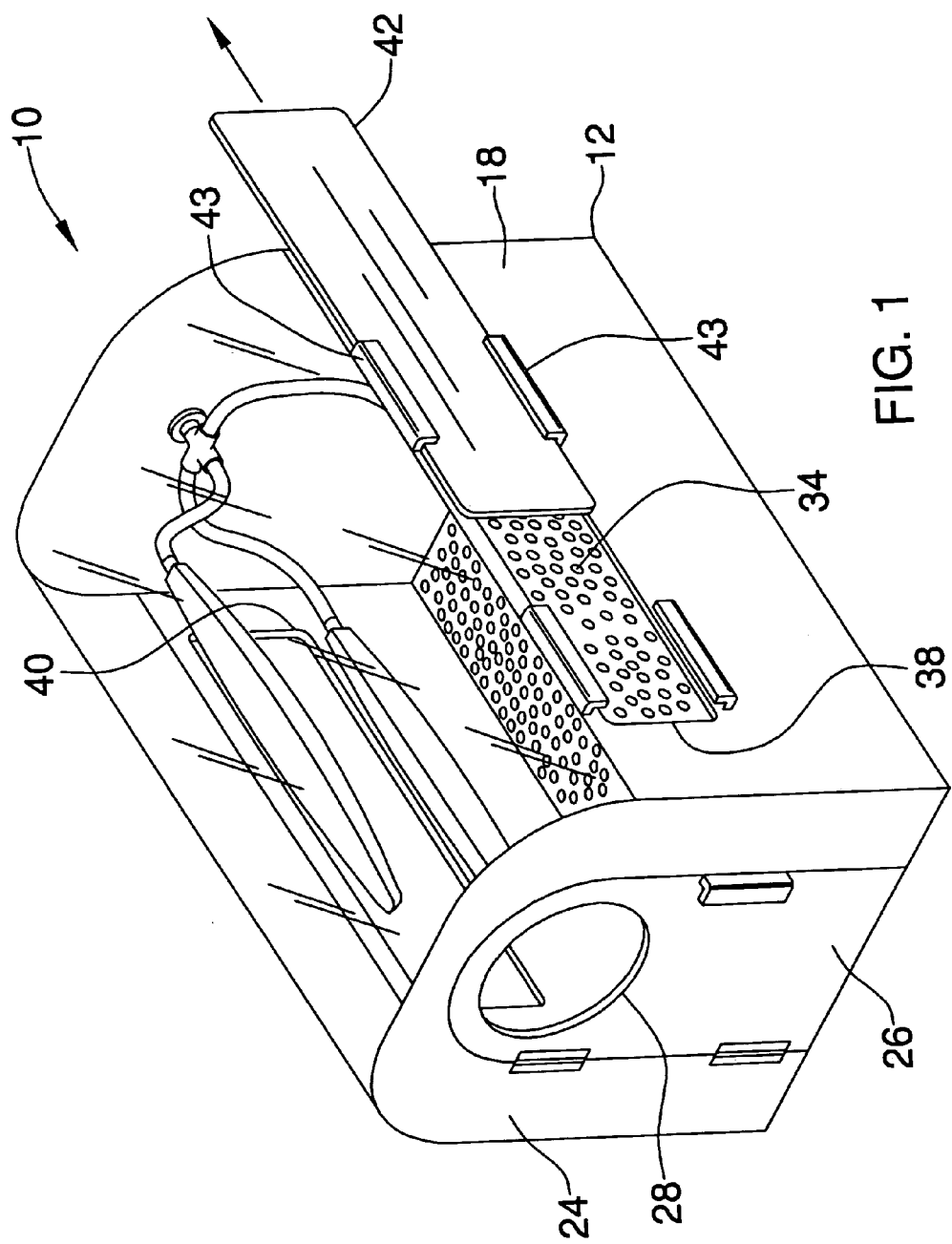
FIG. 1 is a perspective view of a pet washing assembly according to the present invention.
Figure 2:
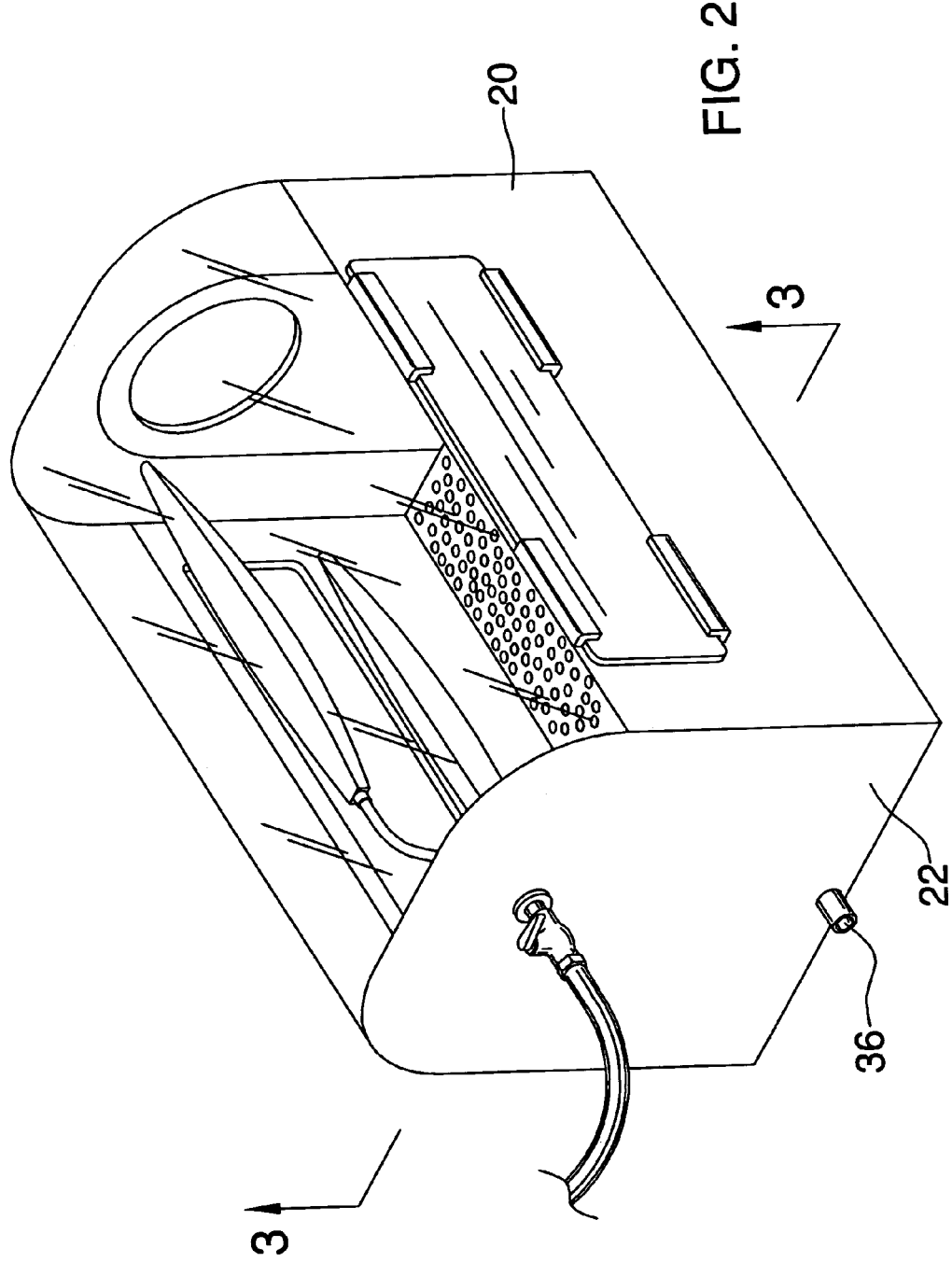
FIG. 2 is a perspective view of the present invention.
Figure 3:
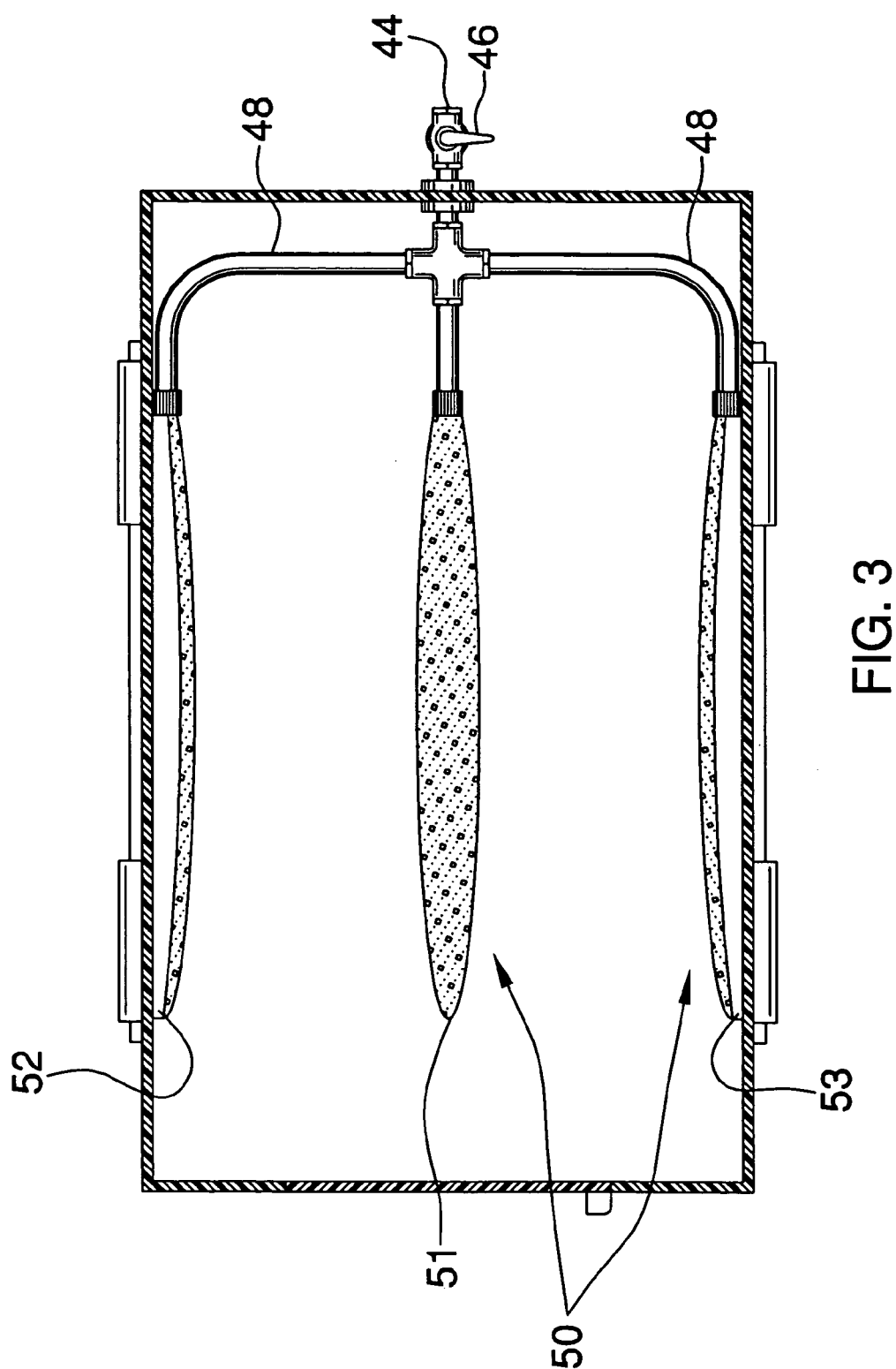
FIG. 3 is a cross-sectional view taken along line 3—3 of FIG. 2 of the present invention.
Figure 4:
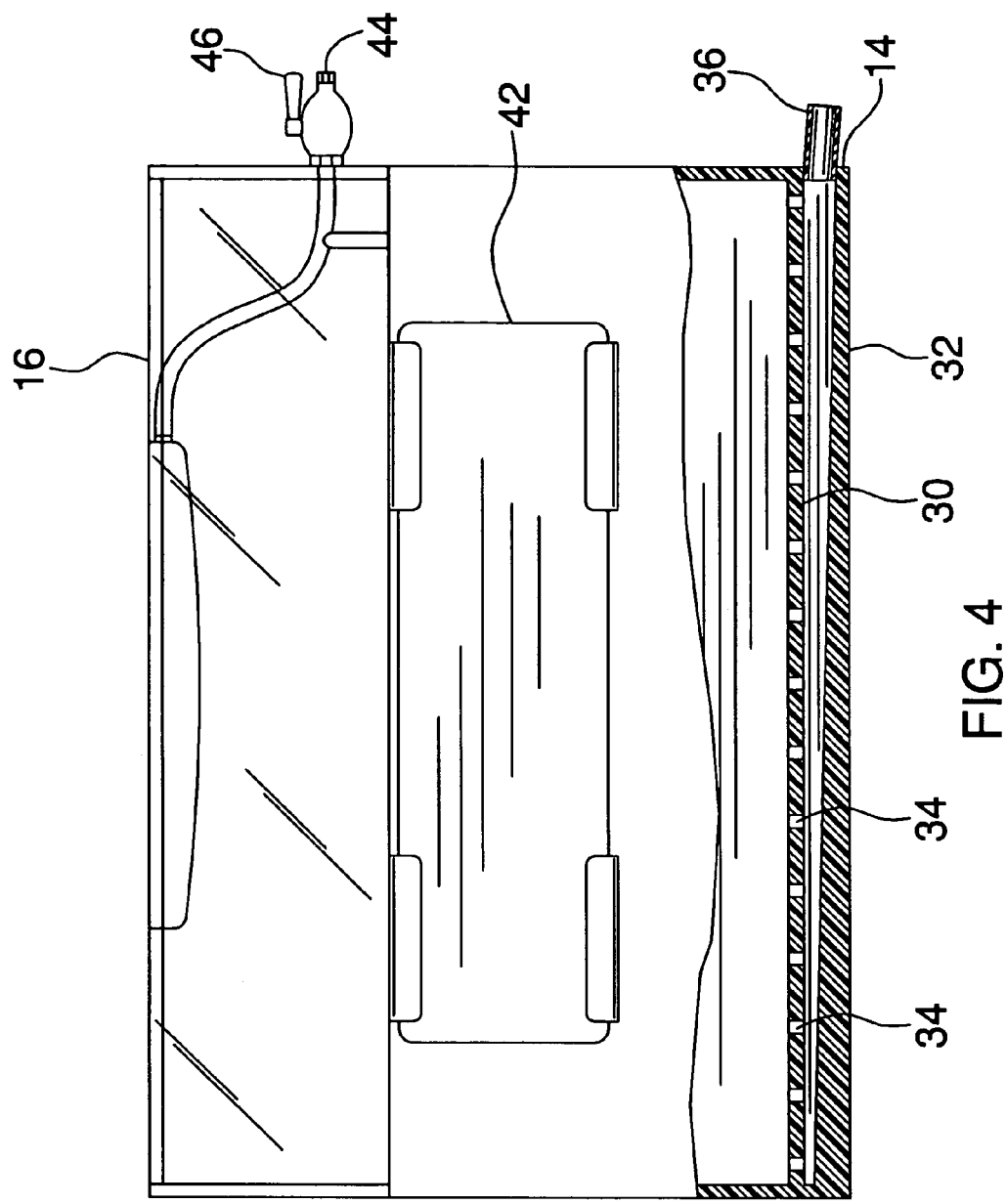
FIG. 4 is a side broken view of the present invention.

With reference now to the drawings, and in particular to FIGS. 1 through 4 thereof, a new pet washing device embodying the principles and concepts of the present invention and generally designated by the reference numeral 10 will be described.

As best illustrated in FIGS. 1 through 4, the pet washing assembly 10 generally comprises a housing 12 that has a bottom wall 14, a top wall 16, a first lateral wall 18, a second lateral wall 20, a back wall 22 and a front wall 24. The front wall 24 has a door 26 therein for selectively positioning the dog into an interior of the housing 12. The door 26 has an aperture 28 extending therethrough adapted for receiving a head of the dog. The bottom wall 14 comprises a drainage pan having an upper wall 30 and lower wall 32 spaced from each other. The upper wall 30 has a plurality of holes 34 therein such that a fluid positioned on the bottom wall 14 will flow through the holes 34 and into an inner space between the upper 30 and lower 32 walls. A drain 36 is fluidly coupled to the inner space. The lower wall 32 is angled toward the drain 36. The first lateral wall 18 has a first elongated opening 38 therein positioned therein and spaced from the bottom wall 14. The second lateral wall 20 has a second elongated opening 40 therein positioned therein spaced from the bottom wall 14. The top wall is substantially transparent and preferably arcuate from the first to second lateral walls.

A pair of coverings 42 is provided. Each of the coverings 42 is positioned over one of the first 38 and second 40 elongated openings in a closed position or in an open position positioned away from the first 38 and second 40 elongated openings. The coverings may be slid on guides 43 attached to the first 18 and second 20 lateral walls.

A water inlet tube 44 extends through the back wall 22. An actuator valve 46 for selectively opening or closing the water inlet tube 44 is fluidly coupled to the water inlet tube 44. The valve 46 is positioned outside of the housing 12. A plurality of supply tubes 48 is positioned within the housing 12 and is fluidly coupled to the inlet tube 44.

A plurality of nozzles 50 is mounted with the housing 12. Each of the nozzles 50 is fluidly coupled to one of the supply tubes 48. The nozzles 50 are each generally directed toward a central area of the interior of the housing 12. Each of the nozzles 50 is elongated and generally extends between the front 24 and back 22 walls. The plurality of nozzles 50 includes at least two nozzles and preferably at least three nozzles. The three nozzles 50 comprise a first nozzle 51 positioned adjacent to the top wall 16, a second nozzle 52 positioned adjacent to the first lateral wall 18 and a third nozzle 53 positioned adjacent to the second lateral wall 20. The second 52 and third 53 nozzles are positioned below and adjacent to one of the first 38 and second 40 elongated openings.

In use, a dog is positioned within the housing 12 so that its head may extend outwardly through the aperture 28. A conventional water supply coupled to the water inlet 44 and a conventional drain hose is coupled to the drain 36. The valve 46 is opened and water hits the dog from both sides and from above. The coverings 42 may be removed for reaching inside of the dog to apply shampoo or other solutions to the coat of the dog. The drain 36 allows the water to run off so that the interior of the housing 12 does not fill with water.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A dog washing assembly adapted for holding a dog and selectively applying water onto the dog, said assembly including:
   a housing having a bottom wall, a top wall, a first lateral wall, a second lateral wall, a back wall and a front wall, said front wall having a door therein for selectively positioning the dog into an interior of the housing, said door having an aperture extending therethrough adapted for receiving a head of the dog, said first lateral wall having an elongated opening therein to provide access to an interior of said housing while retaining said door in a closed position;
   a covering being positioned over said elongated opening in a closed position, said covering being slidable away from said elongated opening to define an open position of said elongated opening;
   a water inlet tube extending through said back wall;
   a plurality of supply tubes being positioned within said housing and being fluidly coupled to said inlet tube; and
   a plurality of nozzles being mounted with said housing, each of said nozzles being fluidly coupled to one of said supply tubes.

2. The dog washing assembly of claim 1, wherein said bottom wall comprises a drainage pan having an upper wall and lower wall spaced from each other, said upper wall having a plurality of holes therein such that a fluid positioned on said bottom wall will flow through said holes and into an inner space between said upper and lower walls, a drain being fluidly coupled to said inner space, said lower wall being angled toward said drain.

3. The dog washing assembly of claim 1, said top wall being substantially transparent.

4. The dog washing assembly of claim 1, further including an actuator valve for selectively opening or closing said water inlet tube being fluidly coupled to said water inlet tube, said valve being positioned outside of said housing.

5. The dog washing assembly of claim 1, wherein each of said nozzles is generally directed toward a central area of said interior of said housing.

6. The dog washing assembly of claim 1, wherein each of said nozzles is elongated and generally extending between said front and back walls.

7. The dog washing assembly of claim 6, wherein said plurality of nozzles includes a first nozzle positioned adjacent to said top wall, a second nozzle positioned adjacent to said first lateral wall and a third nozzle positioned adjacent to said second lateral wall.

8. The dog washing assembly of claim 7, wherein said elongated opening in said first later wall defines a first elongated opening, a second elongated opening being positioned in said second lateral wall, said second and third nozzles being positioned below and adjacent to one of said first and second elongated openings, a covering being positioned over said second elongated opening in a closed position, said covering over said second elongated opening being slidable away from said elongated opening to define an open position of said elongated opening.

9. The dog washing assembly of claim 1, wherein each of said nozzles is generally directed toward a central area of said interior of said housing.

10. The dog washing assembly of claim 9, wherein said plurality of nozzles includes a first nozzle positioned adjacent to said top wall, a second nozzle positioned adjacent to said first lateral wall and a third nozzle positioned adjacent to said second lateral wall.

11. The dog washing assembly of claim 10, wherein said elongated opening in said first later wall defines a first elongated opening, a second elongated opening being positioned in said second lateral wall, said second and third nozzles being positioned below and adjacent to one of said first and second elongated openings, a covering being positioned over said second elongated opening in a closed position, said covering over said second elongated opening being slidable away from said elongated opening to define an open position of said elongated opening.

12. The dog washing assembly of claim 1, wherein each of said nozzles is elongated and generally extending between said front and back walls.

13. A dog washing assembly adapted for holding a dog and selectively applying water onto the dog, said assembly including:
   a housing having a bottom wall, a top wall, a first lateral wall, a second lateral wall, a back wall and a front wall, said front wall having a door therein for selectively positioning the dog into an interior of the housing, said door having an aperture extending therethrough adapted for receiving a head of the dog, said bottom wall comprising a drainage pan having an upper wall and lower wall spaced from each other, said upper wall having a plurality of holes therein such that a fluid positioned on said bottom wall will flow through said holes and into an inner space between said upper and lower walls, a drain being fluidly coupled to said inner space, said lower wall being angled toward said drain, said first lateral wall having a first elongated opening therein positioned therein and spaced from said bottom wall, said second lateral wall having a second elongated opening therein positioned therein and spaced from said bottom wall, said top wall being substantially transparent;
   a pair of coverings, each of said coverings being positioned over one of said first and second elongated openings in a closed position or in an open position positioned away from said first and second elongated openings, said covering being slidably positioned into said open or closed positions;
   a water inlet tube extending through said back wall, an actuator valve for selectively opening or closing said water inlet tube being fluidly coupled to said water inlet tube, said valve being positioned outside of said housing;
   a plurality of supply tubes being positioned within said housing and being fluidly coupled to said inlet tube;
   and a plurality of nozzles being mounted with said housing, each of said nozzles being fluidly coupled to one of said supply tubes, each of said nozzles being generally directed toward a central area of said interior of said housing, each of said nozzles being elongated and generally extending between said front and back walls, said plurality of nozzles including a first nozzle positioned adjacent to said top wall, a second nozzle positioned adjacent to said first lateral wall and a third nozzle positioned adjacent to said second lateral wall, said second and third nozzles being positioned below and adjacent to one of said first and second elongated openings.

\* \* \* \* \*